United States Patent
Setiawan et al.

(10) Patent No.: US 10,078,616 B2
(45) Date of Patent: Sep. 18, 2018

(54) SYSTEM, USB TYPE-C CONNECTOR AND METHOD TO TRANSMIT ENCODED DATA

(71) Applicant: Silicon Laboratories Inc., Austin, TX (US)

(72) Inventors: Ricky Setiawan, Singapore (SG); Rex Wong Tak Ying, Singapore (SG)

(73) Assignee: Silicon Laboratories Inc., Austin, TX (US)

( * ) Notice: Subject to any disclaimer, the term of this patent is extended or adjusted under 35 U.S.C. 154(b) by 211 days.

(21) Appl. No.: 15/165,484

(22) Filed: May 26, 2016

(65) Prior Publication Data

US 2017/0344508 A1   Nov. 30, 2017

(51) Int. Cl.
| | |
|---|---|
| *G06F 13/00* | (2006.01) |
| *G06F 13/42* | (2006.01) |
| *G06F 13/40* | (2006.01) |
| *G06F 13/28* | (2006.01) |
| *G06F 13/362* | (2006.01) |

(52) U.S. Cl.
CPC ........ *G06F 13/4282* (2013.01); *G06F 13/287* (2013.01); *G06F 13/4022* (2013.01); *G06F 13/362* (2013.01)

(58) Field of Classification Search
CPC ............................ G06F 13/362; G06F 13/4282
See application file for complete search history.

(56) References Cited

U.S. PATENT DOCUMENTS

| | | | | |
|---|---|---|---|---|
| 9,400,546 | B1* | 7/2016 | Agarwal | G06F 1/3287 |
| 9,625,988 | B1* | 4/2017 | Agarwal | G06F 1/3296 |
| 9,824,045 | B2* | 11/2017 | Waters | G06F 13/362 |
| 9,871,524 | B2* | 1/2018 | Kim | H03K 19/01859 |
| 2015/0261714 | A1* | 9/2015 | Talmola | G06F 13/4081 710/313 |
| 2015/0268688 | A1* | 9/2015 | Leinonen | G06F 13/409 307/147 |
| 2016/0188514 | A1* | 6/2016 | Forghani-Zadeh | G06F 13/385 710/313 |

OTHER PUBLICATIONS

USB 3.0 Promoter Group, USB Type-C Cable and Connector Specification, "Universal Serial Bus fype-C Cable and Connector Specification," Revision 1.2 Mar. 25, 2016, 221 pages.*

(Continued)

*Primary Examiner* — Tammara R Peyton
(74) *Attorney, Agent, or Firm* — Egan Peterman Enders Huston (57) ABSTRACT

A system, USB Type-C connector and method are provided herein to transmit encoded data across a USB cable from a transmitter circuit included within a transmitting port of a USB Type-C connector. The method described herein may generally include detecting a voltage generated at a configuration channel (CC) pin of a transmitting port of a USB Type-C connector, setting a voltage at an output node of the transmitter circuit equal to the voltage detected at the CC pin before the output node of the transmitter circuit is connected to the CC pin, subsequently connecting the output node of the transmitter circuit to the CC pin, and transmitting the encoded data from the transmitter circuit through the CC pin to the USB cable.

26 Claims, 7 Drawing Sheets

(56) References Cited

OTHER PUBLICATIONS

Microchip, AN1953, Introduction to USB Type C, 20 pg. (Jan. 2015).
Texas Instruments, TUSB320, TUSB320I, TUSB320 USB Type-C Configuration Channel Logic and Port Control, 33 pgs. (Jun. 2015).
Universal Serial Bus Power Delivery Specification, Rev. 2.0, V1.1, 544 pgs. (May 7, 2015).
Universal Serial Bus Type-C Cable and Connector Specification, Rel. 1.1., 180 pgs. (Apr. 3, 2015).

* cited by examiner

SYSTEM, USB TYPE-C CONNECTOR AND METHOD TO TRANSMIT ENCODED DATA

BACKGROUND

1. Field of the Disclosure

This disclosure relates to USB Type-C connectors and, more particularly, to a USB Type-C connector and method to transmit Bi-phase Mark Coding (BMC) encoded data signals across a configuration channel (CC) line of a USB cable.

2. Description of the Relevant Art

The following descriptions and examples are provided as background only and are intended to reveal information that is believed to be of possible relevance to the present disclosure. No admission is necessarily intended, or should be construed, that any of the following information constitutes prior art impacting the patentable character of the subject matter claimed herein.

Electronic devices are often equipped with various types of interfaces, which enable power and/or data delivery to and from the device. One example of such an interface is the Universal Serial Bus (USB) interface. USB is an industry standard developed by the USB Implementers Forum (USB IF), which defines characteristics of the cables, connectors and communications protocols used in a bus for connection, communication, and power delivery between computers and electronic devices. USB is currently used in many different types of devices (such as desktops, laptops, tablets, mobile phones, PDAs, etc.) and accessories (such as keyboards, mice, power supplies and chargers, spare battery packs, docking stations, external hard drives, audio headsets, speakers, cameras, etc.). USB interfaces may take various forms, including both wired and wireless interfaces, and enable devices and accessories to communicate according to a variety of data communication standards, such as USB 1.0, USB 2.0, USB 3.0, and USB 3.1, as well as any future revisions thereof.

In 2015, the USB IF released the USB Type-C Cable and Connector Specification (v1.1) and USB Power Delivery Revision 2.0 Specification (v1.1). The USB Type-C Cable and Connector Specification describes receptacle and plug (collectively referred to herein as "connectors") and cable configurations that provide a smaller, thinner and more robust alternative to the USB 3.1 interface (i.e., Standard and Micro USB cables and connectors). USB Type-C receptacles are intended for use within very thin platforms, such as ultra-thin laptops, tablets and smartphones, where existing Standard and Micro USB receptacles are deemed too large. The USB Type-C plug provides greater ease of use by enabling the plug to be inserted into the receptacle right side-up or upside-down, while the USB Type-C cable enhances ease of use by being plug-able in either direction between host and device. Functional signal plans for a USB Type-C receptacle interface 10 and a USB Type-C plug interface 26 are illustrated in FIGS. 1 and 2.

Figure 1:
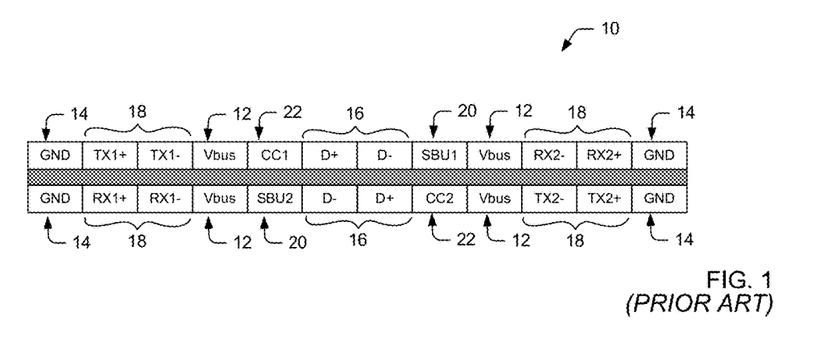
FIG. 1 illustrates a functional signal plan for a USB Type-C receptacle interface.
Figure 2:
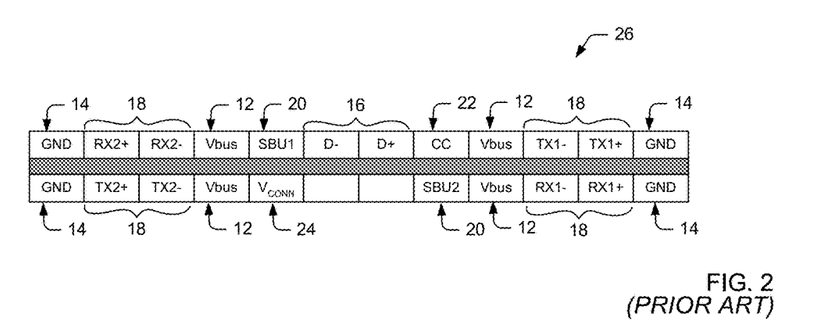
FIG. 2 illustrates a functional signal plan for a USB Type-C plug interface.

As shown in FIG. 1, USB Type-C receptacle interface 10 provides two pairs of power pins (Vbus) 12, two pairs of ground pins (GND) 14, two differential pairs of USB 2.0 data bus pins (D+/−) 16, four pairs of USB 3.1 high speed data bus pins (TX and RX) 18, two sideband use pins (SBU1, SBU2) 20 and two configuration channel pins (CC1, CC2) 22. Similar to receptacle interface 10, USB Type-C plug interface 26 provides two pairs of power pins (Vbus) 12, two pairs of ground pins (GND) 14, four pairs of USB 3.1 high speed data bus pins (TX and RX) 18, and two sideband use pins (SBU1, SBU2) 20. Unlike receptacle interface 10, however, plug interface 26 comprises only one differential pair of USB 2.0 data bus pins (D+/−) 16 and only one configuration channel pin (CC) 22. In addition, plug interface 26 includes a voltage connect pin ($V_{CONN}$) 24 to provide power to circuits within the plug. When plug interface 26 is inserted into receptacle interface 10, one of the CC pins (CC1 or CC2) in the receptacle interface 10 is connected to the CC pin in the plug interface 26 through the cable to establish signal orientation. The other CC pin (CC1 or CC2) in receptacle interface 10 is repurposed as $V_{CONN}$ for powering circuits within the plug.

The configuration channel pins are generally used for detecting cable attach and detach, detecting plug orientation (i.e., right side-up or upside-down), and establishing Vbus current. In USB Type-C connectors, the CC pins are also used for transmitting and receiving USB Power Delivery (PD) communication messages for establishing power contracts that allow voltage and current levels, which are outside those defined by the USB 2.0 and USB 3.1 Specifications, changing the port sourcing Vbus or $V_{CONN}$, swapping port roles (e.g., between source and sink, or downstream facing port, DFP, and upstream facing port, UFP) and communicating with cables. The USB Power Delivery Specification Revision 2.0 provides methods and specifications for communicating USB PD communication messages between different types of USB connectors (e.g., USB Type-A, -B and -C) and legacy applications. Failure to meet these specifications may cause several undesirable problems, such as creating a source of electromagnetic interference (EMI) and power loss, and falsely triggering a USB Type-C receiver to turn on.

SUMMARY

The following description of various embodiments of systems, USB Type-C connectors and methods is not to be construed in any way as limiting the subject matter of the appended claims.

Generally speaking, the present disclosure provides a USB system, USB Type-C connector and method to transmit Bi-phase Mark Coding (BMC) encoded data signals across a configuration channel (CC) line of a USB cable connecting a transceiver within a transmitting port to a transceiver within a receiving port of the USB system. In the present disclosure, additional circuitry is provided within the USB Type-C connector to control the slew rate of each transition, or edge, of a BMC encoded data signal transmitted from the transceiver circuit, while meeting the rise and fall times set forth in the PD specification. The additional circuitry and methods described herein enable the transceiver circuit to control the slew rate and meet the specified rise and fall times during all transitions of the BMC encoded data signal, including the initial transition from the high impedance state to the logic '0' state and each subsequent rising and falling edge transition. In doing so, the additional circuitry and methods described herein avoid many undesirable problems, such as voltage ringing on the CC line, reduced power efficiency during start transmission, and false triggering of a receiver within an upstream USB Type-C connector.

According to one embodiment, a system is provided herein comprising a first USB Type-C connector coupled to a second USB Type-C connector via a USB cable. According to another embodiment, a method is provided herein to transmit encoded data across a USB cable from a transceiver circuit included within a transmitting port of a first USB Type-C connector to a transceiver circuit included within a receiving port of a second USB Type-C connector. Since the encoded data may be transmitted across the USB cable in either direction (i.e., from the first USB Type-C connector to the second USB Type-C connector, and vice versa), the first and second USB Type-C connectors may each include transceivers having transmitter circuitry and receiver circuitry. At least some of the additional circuitry described herein may be provided within the transmitter circuits included within the transceivers of the first and second USB Type-C connectors for controlling the slew rate of the BMC encoded data signals transmitted from either connector.

In accordance with the present disclosure, a USB Type-C connector (e.g., the first USB Type-C connector) may include at least one configuration channel (CC) pin, a plurality of switches coupled to the at least one CC pin, a transmitter circuit and a controller. The transmitter circuit may have an output node, which may be switchably coupled to the at least one CC pin to transmit encoded data across the USB cable to a CC pin of another USB Type-C connector (e.g., the second USB Type-C connector). The controller may be coupled and configured to supply a sequence of control signals to the transmitter circuit and to the plurality of switches to set a voltage at the output node of the transmitter circuit equal to a voltage generated at the at least one CC pin before the output node of the transmitter circuit is connected to the at least one CC pin to transmit the encoded data across the USB cable.

According to one embodiment, the transmitter circuit may include a multiplexer and an amplifier in addition to other circuitry, which may typically be used to encode and drive the BMC encoded data signals. The multiplexer may include a first input coupled to receive encoded data, a second input coupled via a first one of the switches (i.e., a first switch) to the CC pin, a select input, and an output. The amplifier may include a first input coupled to receive the output from the multiplexer, a second input coupled via a second one of the switches (i.e., a second switch) to the at least one CC pin, and an output, which may also be the output node of the transmitter circuit. The output of the amplifier may be coupled via a fourth one of the switches (i.e., a fourth switch) to the second input of the amplifier, and may be further coupled via a fifth one of the switches (i.e., a fifth switch) to the at least one CC pin. In some embodiments, a pull-down resistor may be coupled between the at least one CC pin and a third one of the switches (i.e., a third switch), which is coupled to ground. In other embodiments, a third one of the switches may be coupled between a current source (or voltage source and pull-up resistor) and the at least one CC pin.

According to one embodiment, a method is provided herein for transmitting encoded data across a USB cable from a transmitter circuit included within a transmitting port of a first USB Type-C connector to a receiver circuit included within a receiving port of a second USB Type-C connector. In general, the method may include detecting a voltage generated at the CC pin of the transmitting port, setting a voltage at an output node of the transmitter circuit equal to the voltage generated at the CC pin before the output node of the transmitter circuit is connected to the CC pin, subsequently connecting the output of the transmitter circuit to the CC pin, and transmitting the encoded data from the transmitter circuit through the CC pin to the USB cable.

According to one embodiment, the controller described herein may be configured to supply a sequence of control signals to the select input of the multiplexer and to the first, second, third, fourth and fifth switches to implement the method described herein. For example, the controller may supply open signals to the first, second and fifth switches to disconnect the output of the amplifier from the CC pin, and may supply close signals to the third and fourth switches. In some cases, the third and fourth switches may be closed prior to opening the first, second and fifth switches. For example, the third switch may be closed upon designating the transmitting port of the first USB Type-C connector as either an upstream facing port (UFP) or a downstream facing port (DFP). By closing the third switch, current flow may be established from the current source (or voltage source and pull-up resistor) in one port through the pull-down resistor and ground connection in another port, and a voltage may be generated at the CC pin. By closing the fourth switch, the output of the amplifier is tied to the second input of the amplifier.

To detect the voltage generated at the CC pin of the transmitting port and set the voltage at the output node of the transmitter circuit equal to the voltage generated at the CC pin, the controller may supply a select signal to the multiplexer for selecting the second input of the multiplexer, and a close signal to the first switch to set the voltage at the amplifier output equal to the voltage at the CC pin. After the voltage at the amplifier output is equalized to the voltage at the CC pin, the controller may supply a select signal to the multiplexer for selecting the first input of the multiplexer, an open signal to the first switch, and close signals to the second and fifth switches to connect the amplifier output to the CC pin and transmit the encoded data from the transmitter circuit through the CC pin to the USB cable. Soon after the fifth switch is closed, the controller may supply an open signal to the fourth switch.

BRIEF DESCRIPTION OF THE DRAWINGS

Other objects and advantages of the disclosure will become apparent upon reading the following detailed description and upon reference to the accompanying drawings.

While the system, USB Type-C connectors and methods disclosed herein are susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF PREFERRED EMBODIMENTS

The present disclosure is directed to systems, electronic devices and accessories including USB Type-C connectors, which may be a USB Type-C receptacle and/or plug, as described in the USB Type-C Cable and Connector Specification (v1.x). In particular, the present disclosure provides a system, USB Type-C connector and method to transmit Bi-phase Mark Coding (BMC) encoded data signals across a configuration channel (CC) line of a USB cable connecting a transceiver within a transmitting port to a transceiver within a receiving port of the USB system. In the present disclosure, additional circuitry provided within the USB Type-C connector enables the transceiver circuit to control the slew rate and meet the rise and fall times specified in the USB Power Delivery Revision 2.0 Specification (v1.1) during all transitions of the BMC encoded data signal, including the initial transition from the high impedance state to the logic '0' state and each subsequent rising and falling edge transition. In doing so, the additional circuitry and methods described herein avoid many undesirable problems, such as voltage ringing on the CC line, reduced power efficiency during start transmission, and false triggering of a receiver within an upstream USB Type-C connector.

USB Type-C connectors may be configured to operate as a downstream facing port (DFP), an upstream facing port (UFP) or a dual role port (DRP). The port designation or role is generally associated with the flow of data in a USB connection. For example, a port on a host may be designated as a DFP for "sourcing" or providing power to a connected device. On the other hand, a port on a connected device may be designated as a UFP for "sinking" or consuming the power provided by the host. In some cases, a host or a device may comprise a DRP, which can operate as a source, operate as a sink, or alternate between the two port states. In addition to the physical pins/receptacles needed to establish electrical contact, a "connector" as described herein also includes the circuitry used to configure and manage power and data flow across a USB cable.

Figure 3:
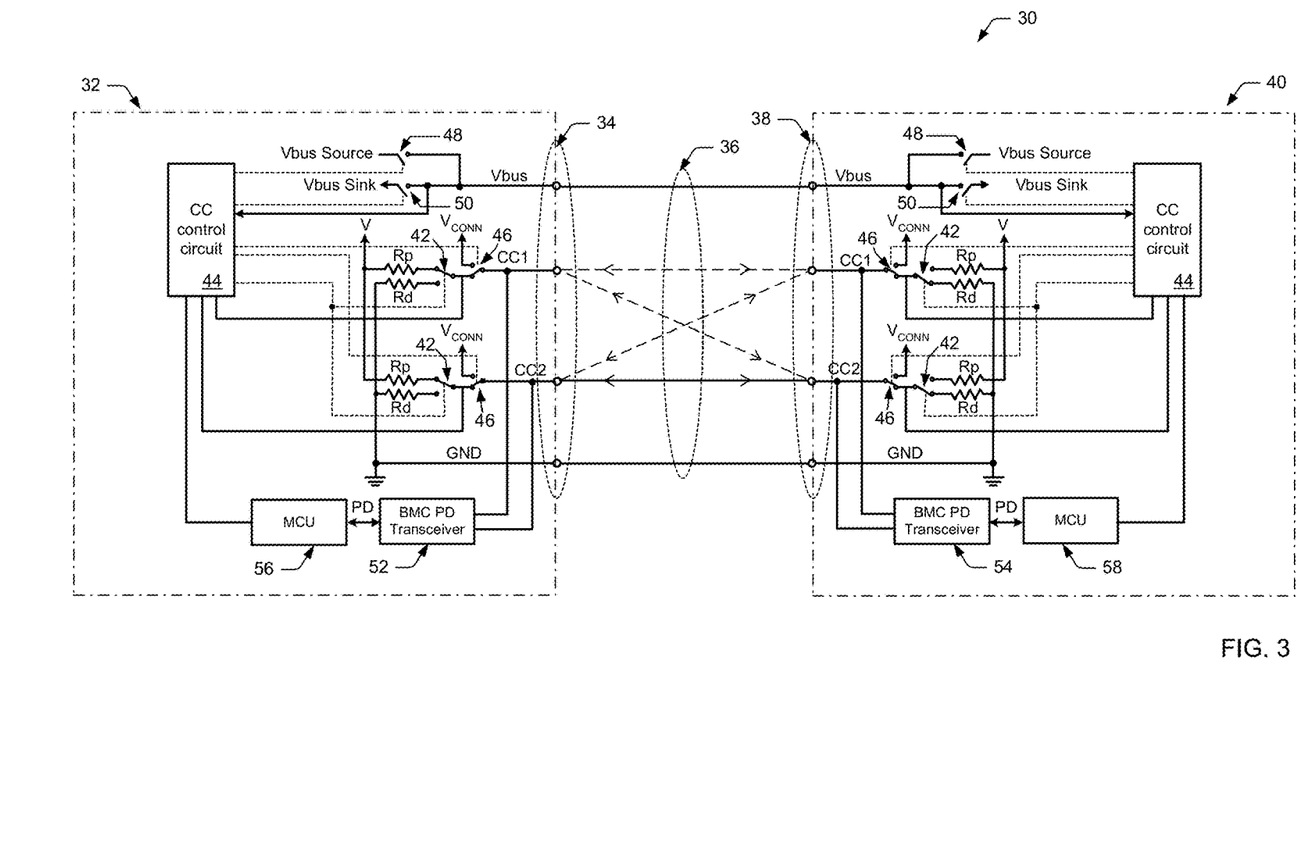
FIG. 3 illustrates a functional diagram of a USB system comprising a first dual role port (DRP) connected to a second dual role port (DRP) via a USB cable having a configuration channel (CC) line.

FIG. 3 illustrates a functional diagram of a system 30 including a first DRP 32 connected to a second DRP 40 via a USB cable 36 and pads 34/38. As noted above, a DRP may operate as a source when configured as a DFP, a sink when configured as a UFP, or may alternate between the two port states. In the particular embodiment illustrated in FIG. 3, DRP 32 is configured to operate as a DFP and DRP 40 is configured to operate as a UFP. When configured to operate as a DFP, DRP 32 may be a port on a host or a hub to which one or more devices/accessories are connected. When configured to operate as a UFP, DRP 40 may be a port on a device/accessory or hub that connects to a host. As described in more detail below, the role designation of the first DRP 32 and the second DRP 40 may be swapped by supplying the appropriate control signals to switches 42 and 46.

Pads 34 and 38 are illustrated in FIG. 3 as comprising power (Vbus), ground (GND) and configuration channel (CC1 and CC2) pins for the purpose of explaining port roles (e.g., as a source or sink for Vbus), and the use of the CC pins for detecting cable connection, detecting signal orientation, and communicating USB PD communication messages. It will be understood, however, that pads 34 and 38 may include additional pins or contacts, as shown in receptacle interface 10 of FIG. 1 and described in the USB Type-C Cable and Connector Specification.

As shown in FIG. 3, each configuration channel pin (CC1 and CC2) in DRP 32 and DRP 40 may be connected to a power source (e.g., a supply voltage within a range of about 1.7V to 3.6V or about 4.7V to 5.5V) by a pull-up resistor (Rp), and may be further connected to a ground source (GND) by a pull-down resistor (Rd). In some cases, the power source and pull-up resistor (Rp) may be replaced by a current source (Ip), as shown for example, in FIGS. 4-5. When a port is configured for sourcing power, the CC pins of that port may be connected to the power source via the pull-up resistor (Rp) (or current source, Ip), as shown in DRP 32. When a port is configured for sinking power, the CC pins of that port may be connected to ground via the pull-down resistor (Rd), as shown in DRP 40. The CC pins of each port may be connected to the pull-up and pull-down resistors by switches 42 and 46, which are controlled by a configuration channel (CC) control circuit 44.

As shown in FIG. 3, there are eight possible connections (denoted with dashed and solid lines) between the CC pins of DRP 32 and the CC pins of DRP 40. When DRP 32 is connected to DRP 40 via cable 36, a connection is established through one CC pin (e.g., CC2) on the DFP side and one CC pin (e.g., CC2) on the UFP side, and a current starts to flow through the connected CC pins. The CC control circuit 44 of both ports is coupled through switches 46 for detecting a voltage generated at the connected CC pin and determining that a connection to a compatible device has been established. CC control circuit 44 can also determine the orientation of the cable plug, depending on whether current flow was detected through CC1 or CC2.

Upon determining that a connection has been established, the CC control circuit 44 within each port may supply appropriate enable/disable signals to switches 48 and 50 (depending on the direction of current flow detected through the CC pins) to establish the direction of current flow on the Vbus line (i.e., to establish each port 32 and 40 as a source or a sink). For example, if DRP 32 is configured to operate as a downstream facing port (DFP) for providing power to DRP 40, the CC control circuits 44 may supply enable signals to switch 48 of DRP 32 and switch 50 of DRP 40 and disable signals to switch 50 of DRP 32 and switch 48 of DRP 40. Doing so would cause current to flow on the Vbus line from a Vbus source coupled to DRP 32 to a Vbus sink coupled to DRP 40.

If, on the other hand, DRP 40 is configured to provide power to DRP 32, the CC control circuits 44 may supply the appropriate control signals to switches 42 and 46 to change the port roles. In FIG. 3, for example, DRP 32 may be configured to operate as a UFP by connecting the CC pins of DRP 32 to pull-down resistors (Rd), and DRP 40 may be configured to operate as a DFP by connecting the CC pins of DRP 40 to pull-up resistors (Rp). After the port roles are swapped, the CC control circuits 44 may supply enable signals to switch 48 of DRP 40 and switch 50 of DRP 32 and disable signals to switch 50 of DRP 40 and switch 48 of DRP 32. This would cause current to flow on the Vbus line from a Vbus source coupled to DRP 40 to a Vbus sink coupled to DRP 32.

In addition to detecting cable attach and detach, detecting plug orientation, and establishing Vbus current, the CC pins of a USB Type-C connector may also be used to transmit and receive USB Power Delivery (PD) communication messages. These messages may be communicated for the purpose of establishing power contracts that allow voltage and current levels, which are outside those defined by the USB 2.0 and USB 3.1 Specifications, changing the port sourcing Vbus or $V_{CONN}$, swapping port roles (e.g., between DFP and UFP) and communicating with cables.

The USB Power Delivery Revision 2.0 Specification (hereinafter referred to as the "PD specification") provides methods and specifications for communicating USB PD communication messages between different types of USB connectors (e.g., USB Type-A, -B and -C) and legacy applications. For USB Type-A/B connectors, PD communication messages are communicated on the Vbus line using Binary Frequency Shift Keying (BFSK) encoded signals. For USB Type-C connectors, PD communication messages are communicated on the CC line using Bi-phase Mark Coded (BMC) encoded signals.

In Bi-phase Mark Coding, a '0' is encoded using one transition at the start of every bit time (UI), while two transitions per UI (i.e., one at the start and one in the middle of the UI) is used to encode a '1'. The encoded data signals are driven on the CC line by a data driver or transmitter with an output voltage swing (vSwing) between 1.05V and 1.2V, per the BMC transmitter specifications defined in table shown below. When transmitting BMC encoded PD messages, the transmitter must also meet other specifications, as defined in the table below.

TABLE

Reproduced from Table 5-25 of USB Power Delivery Specification Revision 2.0 (v1.1)

| Name | Description | Min | Nom | Max | Units |
|---|---|---|---|---|---|
| tEndDriveBMC | Time to cease driving the line after the end of the last bit of the Frame. | | | 23 | µs |
| tFall | Fall Time | 300 | | | ns |
| tHoldLowBMC | Time to cease driving the line after the final high-to-low transition. | 1 | | | µs |
| tRise | Rise Time | 300 | | | ns |
| vSwing | Voltage Swing | 1.05 | 1.125 | 1.2 | V |
| zDriver | Transmitter output impedance | 33 | | 75 | Ω |

In the BMC signaling scheme, each PD communication message frame or packet includes a preamble, a start of packet (SOP) bit(s), a payload, a cyclic redundancy check (CRC) bit(s) and an end of packet (EOP) bit(s). As set forth in the PD specification, the transmitter circuit must begin by transmitting a logic low level (i.e., logic '0') when sending the first bit of the preamble of each message frame, and must terminate the final bit of each message frame with a trailing edge (e.g., a low-to-high transition or a high-to-low transition) to ensure that a downstream receiver properly receives the final bit.

If the trailing edge is a high-to-low transition, the PD specification dictates that the transmitter circuit should drive the CC line low for a duration of tHoldLowBMC and continue to drive the CC line low for a duration of tEndDriveBMC (as measured from the trailing edge of the final bit of the frame), before releasing the CC line to a high impedance state. If the trailing edge is a low-to-high transition, the PD specification states that the transmitter should continue to drive the CC line high for one UI, then drive the CC line low for a duration of tHoldLowBMC and continue to drive the CC line low for a duration of tEndDriveBMC (as measured from the trailing edge of the final bit of the frame), before releasing the CC line to the high impedance state. The PD specification further specifies that each bit of the transmitted signal should have a rise time no faster than tRise (e.g., 300 ns) and a fall time no faster than tFall (e.g., 300 ns).

In many cases, the transmitter circuit may exhibit a well-controlled slew rate when transitioning from a logic '0' to a logic '1' bit when the voltage state on the CC line is known (e.g., when transmitting bits other than the first bit of the message frame). However, a problem arises during the first bit transmission, such as when transmitting the first bit in the preamble of the PD communication message frame.

Before the transmitter circuit can begin driving the CC line, the PD specification dictates that the CC line should be placed in a high impedance state, where its voltage is defined by the pull-up resistors, Rp, (or pull-up current source, Ip) and pull-down resistors, Rd, in the DFP and UFP. Depending on the value of Rp/Ip, Rd and the supply voltage (e.g., 3.3 V), the CC line voltage can vary from about 0.25 V to about 2.45 V when placed in the high impedance state. When the transmitter circuit is initially connected to the CC line for communicating the first bit of a PD communication message frame, the transmitter circuit must drive the CC line from the unknown voltage at the high impedance state to the logic '0' state whilst meeting the fall time requirement (e.g., 300 ns, as shown in the Table above) set forth in the PD specification. In addition, a high frequency voltage ringing may be observed on the CC line during the first bit transmission due to the large inductance of the cable 36 connecting DRP 32 to DRP 40. This high frequency voltage ringing may cause multiple problems, such as creating a source of electromagnetic interference (EMI) for the whole USB system, creating a source of power loss, and falsely triggering the receiver to turn on.

As described in more detail below, the embodiments described herein avoid the voltage ringing commonly observed during the first bit transmission and provide a well-controlled slew rate when transmitting BMC encoded PD communication messages on the CC line of a USB cable. According to one embodiment, an improved circuit and method are disclosed herein for sensing the CC line voltage at the high impedance state before the transmitter is connected to the CC line, equalizing the output of the transmitter circuit to the CC line voltage, and after a programmable time delay, connecting the transmitter circuit to the CC line for driving the first and subsequent bits of the BMC encoded PD communication message onto the CC line. Such embodiments enable the transmitter to drive the CC line from the high impedance state to the logic '0' state (as well as from logic '0' to '1' and from logic '1' to '0') at a well-controlled slew rate, while meeting both the rise and fall times set forth in the PD specification. As such, the disclosed embodiments avoid the undesirable problems mentioned above, such as EMI due to voltage ringing on the CC line, reduced power efficiency during start transmission, and false triggering of the receiver.

FIGS. 3-8 illustrate exemplary block diagrams, circuits, methods and state diagrams in accordance with the embodiments described herein. As shown in FIG. 3, DRP 32 and DRP 40 each include a BMC PD transceiver circuit 52 and 54 for encoding and transmitting BMC encoded PD communication messages onto the CC line of the USB cable 36. In one embodiment, transceiver circuits 52 and 54 may be coupled for receiving PD communication messages from an on-chip processing device, such as the microcontroller units (MCUs) 56 and 58 shown in FIG. 3. When transmitting BMC encoded PD communication messages on the CC line from DRP 32 to DRP 40, transmitter circuitry within transceiver circuit 52 may be used to transmit the encoded data via the CC line in USB cable 36 to receiver circuitry within transceiver circuit 54. The opposite may be true when transmitting BMC encoded PD communication messages from DRP 40 to DRP 32. As shown in FIG. 3, the transceiver circuits 52 and 54 within each port may be coupled to both CC pins (CC1 and CC2), so that the BMC encoded PD communication messages can be communicated on the CC line of USB cable 36 through a connected pair of the CC pins (e.g., CC2 in the example of FIG. 3) in DRP 32 and DRP 40.

Although not shown in FIG. 3, transmitter circuitry within a downstream or upstream transceiver (e.g., transceiver 52 within DRP 32 or transceiver 54 within DRP 40) may be coupled to transmit data onto the CC line. In general, the transmitter circuitry may include a 4b5b encoder and a BMC encoder for encoding the data before the encoded data is transmitted onto the CC line. Receiver circuitry included within an upstream or downstream transceiver (e.g., transceiver 54 within DRP 40 or transceiver 52 within DRP 32) may be coupled to receive the encoded data transmitted on the CC line. The receiver circuitry may generally include a BMC decoder, a SOP detect, and a 5b4b decoder for decoding the received data. To verify the accuracy of the transmitted data, the transmitter and receiver circuitry may also include a cyclic redundancy check (CRC) circuit. In addition to the components typically included within a transceiver configured to communicate BMC encoded PD messages, additional circuitry is included within the downstream and upstream ports to control the slew rate of the transmitted data and avoid voltage ringing on the CC line when transmitting the first data bit. Such additional circuitry is illustrated in the example embodiments shown in FIGS. 4A-B and 5A-B.

Figure 4A:
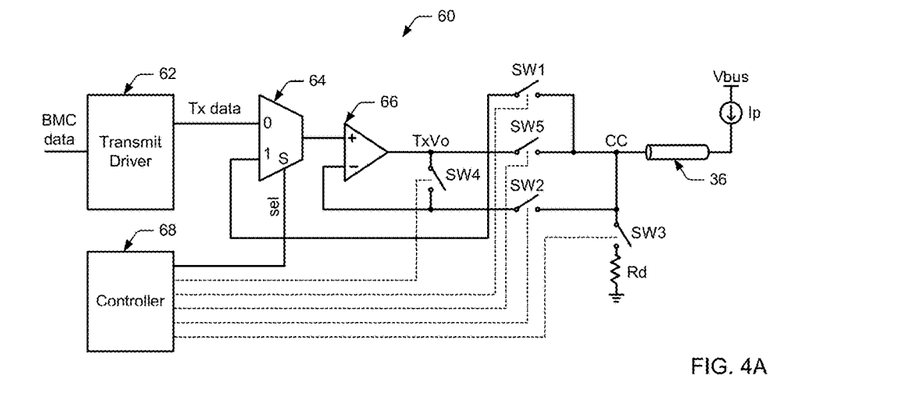
FIG. 4A illustrates a simplified circuit diagram of circuitry added to a DRP (configured as an upstream facing port, UFP) for transmitting encoded data across the CC line of a USB cable.
Figure 4B:
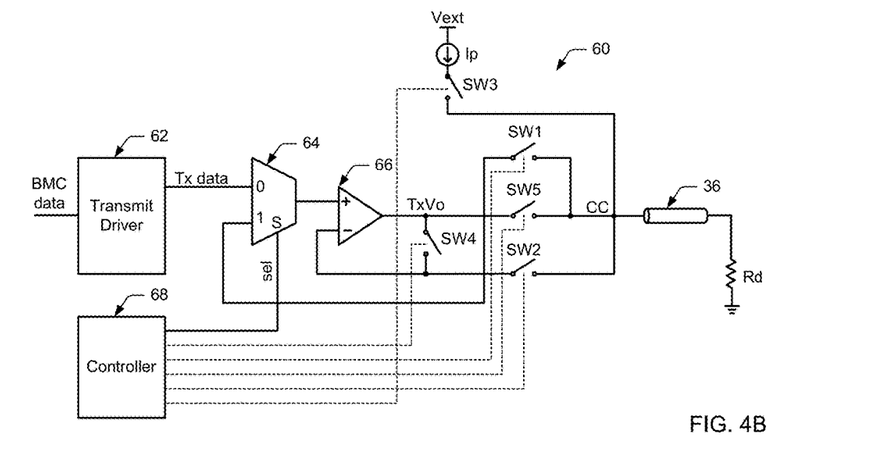
FIG. 4B illustrates a simplified circuit diagram of circuitry added to a DRP (configured as a downstream facing port, DFP) for transmitting encoded data across the CC line of a USB cable.

FIG. 4A illustrates a simplified circuit diagram of additional circuitry 60 that may be added to a DRP, which is configured to operate as a UFP (e.g., DRP 32 of FIG. 3). FIG. 4B illustrates a simplified circuit diagram of additional circuitry 60 that may be added to a DRP, which is configured to operate as a DFP (e.g., DRP 40 of FIG. 3). According to one embodiment, the additional circuitry 60 may generally include a multiplexer 64, an amplifier 66, a controller 68 and a plurality of switches SW1 . . . SW5.

As shown in FIGS. 4A-B, multiplexer 64 may be coupled for receiving transmit data (TX data) from a transmit driver 62, which in turn, may be coupled for receiving BMC encoded data (BMC data) from a BMC encoder, as mentioned above. In the embodiments shown in FIG. 4A-B, the transmit data is supplied to a first input (e.g., input '0') of multiplexer 64, while a second input (e.g., input '1') of the multiplexer is coupled through a first switch (i.e., SW1) to the connected CC pin (e.g., CC1 or CC2). As described in more detail below, a select signal (sel) may be supplied to a select input (S) of multiplexer 64 to switch between transmitting data and sensing a voltage generated at the CC pin.

As shown in FIGS. 4A-B, the output of multiplexer 64 is coupled to a positive input of amplifier 66, which may be a differential to single-ended amplifier, in one embodiment. The negative input of amplifier 66 is coupled through a second switch (i.e., SW2) to the connected CC pin (e.g., CC1 or CC2). The output of amplifier 66 is coupled through a fourth switch (i.e., SW4) to the negative input of amplifier 66, and through a fifth switch (i.e., SW5) to the connected CC pin.

In the embodiments shown in FIGS. 4A-B, a third switch (i.e., SW3) is included within each port to establish current flow from a current source (Ip) (or voltage source and pull-up resistor, Rp) in one port to a pull-down resistor (Rd) and ground connection in the other port. This third switch is illustrated in FIG. 3 as switch 42. When a DRP operates as a UFP (e.g., DRP 32 of FIG. 3), the third switch is actuated to enable current to flow from a current source (Ip) in the downstream port (e.g., DRP 40 of FIG. 3) to the pull-down resistor (Rd) and ground connection in the upstream port. This is shown in FIG. 4A by illustrating the third switch as coupled between the CC pin and Rd. When a DRP operates as a DFP (e.g., DRP 40 of FIG. 3), the third switch is actuated to enable current to flow from a current source (Ip) in the upstream port (e.g., DRP 32 of FIG. 3) to the pull-down resistor (Rd) and ground connection in the downstream port. This is shown in FIG. 4B by illustrating the third switch as coupled between the current source and the CC pin. Although not explicitly illustrated in FIGS. 4A-B, each port includes its own current source (Ip) (or voltage source and pull-up resistor, Rp) and pull-down resistor (Rd), but will connect only one to the CC pin, depending on the designated port role.

Current flow through the pull-down resistor (Rd) generates a voltage at the connected CC pins of the downstream and upstream ports. As noted above, the voltage generated at the connected CC pin may be dependent on the value of Ip (or Rp), Rd and Vbus, and may vary over a substantially wide range (e.g., between about 0.25 V and about 2.45 V) when the CC line is placed in the high impedance state.

Before the transmitter circuit is connected to the CC line for transmitting encoded data, a select signal of '1' may be supplied to the select input of multiplexer 64 and the first switch may be closed to detect the voltage generated at the CC pin of the transmitting port and set the voltage (TxVo) at the output of amplifier 66 equal to the voltage detected at the CC pin. In some embodiments, the fourth switch (i.e., SW4), which is coupled in parallel between the output and negative terminal of amplifier 66, may be closed prior to closing the first switch. As described in more detail below, the first switch may be closed for equalizing the TxVo and CC pin voltages before transmitting the first data bit. After the TxVo and CC pin voltages are equalized, the output of amplifier 66 may be coupled through the fifth switch (i.e., SW5) to the connected CC pin (e.g., CC1 or CC2) for connecting the transmitter circuit to the CC line of the USB cable 36 when the fifth switch is closed. The negative input of the amplifier 66 may also be coupled to the connected CC pin through the second switch (i.e., SW2) when the fifth switch is closed. After a programmable time delay, the fourth switch may be opened to drive the transmit data onto the CC line.

As shown in FIGS. 4A-B, controller 68 may be coupled for controlling the state of multiplexer 64 and switches SW1 . . . SW5. In some embodiments, controller 68 may reside within the BMC PD transceiver circuits 52 and 54 shown, for example, in the upstream and downstream facing ports of FIG. 3. However, controller 68 is not necessarily restricted to residing within transceiver circuits 52 and 54, and may reside elsewhere in other embodiments of the disclosure.

According to one embodiment, controller 68 may comprise a digital logic block. The digital logic block of controller 68 may comprise a sequence of logic components (such as flip flop(s), inverter(s) and logic gate(s)), which are coupled for supplying a sequence of control signals to the multiplexer 64 and the switches SW1 . . . SW5 shown in FIGS. 4-5. According to one embodiment, these logic components may implement a state machine, as shown for example in FIG. 8. As described in more detail below, controller 68 may supply the sequence of control signals to multiplexer 64 and to switches SW1 . . . SW5 for equalizing the TxVo and CC pin voltages before the amplifier output is connected to the CC pin and the transmit data is driven onto the CC line.

Figure 5A:
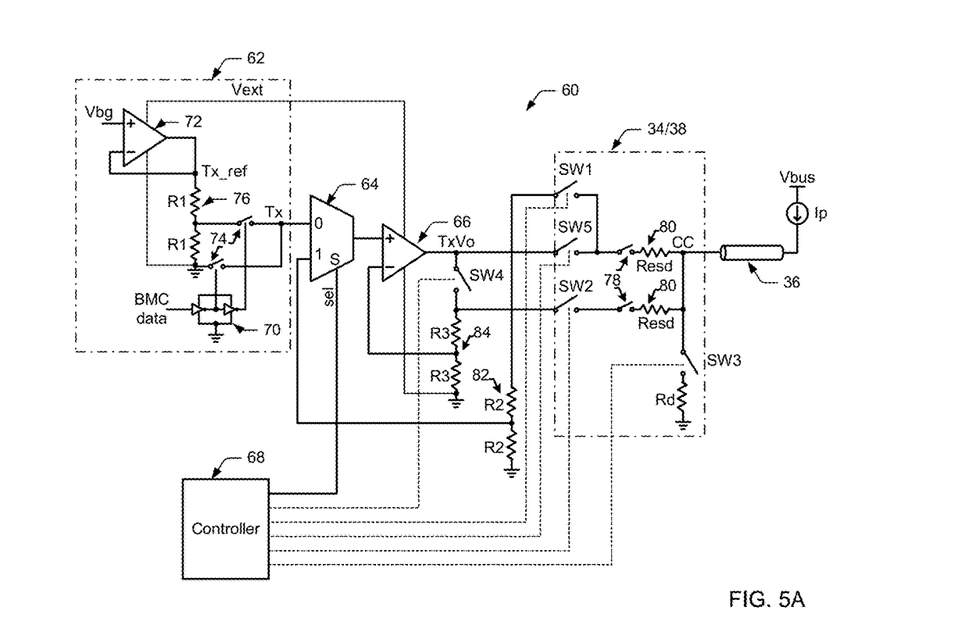
FIG. 5A illustrates a more detailed circuit diagram of the additional circuitry shown in FIG. 4A, according to one embodiment.
Figure 5B:
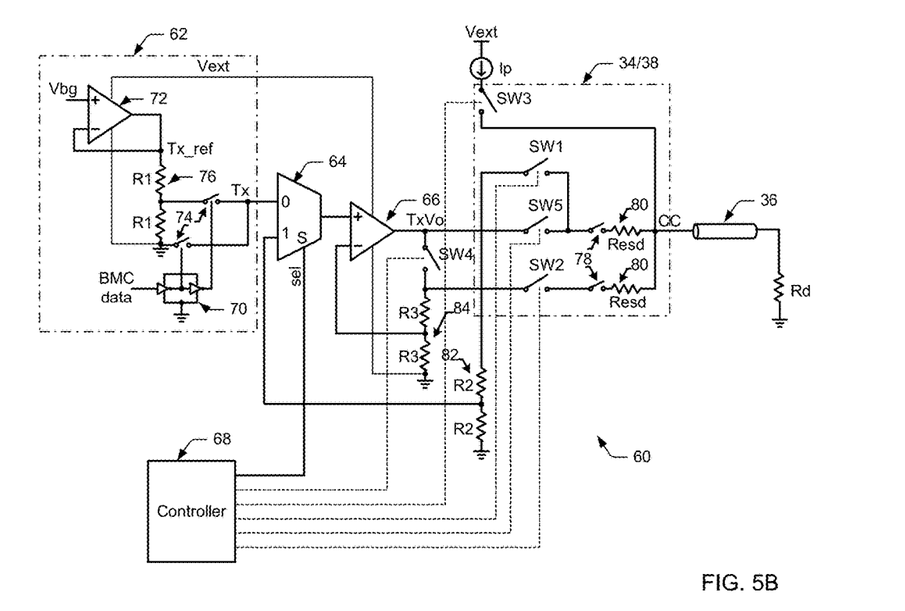
FIG. 5B illustrates a more detailed circuit diagram of the additional circuitry shown in FIG. 4B, according to one embodiment.

FIGS. 5A and 5B provide slightly more detailed circuit diagrams of the additional circuitry 60 respectively shown in FIGS. 4A and 4B. The additional circuitry 60 shown in FIGS. 5A-5B includes many of the same circuit components shown in the simplified circuit diagrams of FIGS. 4A-B and described above. Similar circuit components are denoted with the same reference numerals in FIGS. 4 and 5. As in FIGS. 4A-B, for example, the additional circuitry 60 shown in FIGS. 5A-B includes multiplexer 64, amplifier 66, controller 68 and switches SW1, SW2, SW3, SW4 and SW5. Description of these components will not be reiterated below for the purpose of brevity.

According to one embodiment, the transmit driver 62 shown in block diagram form in FIGS. 4A-B is illustrated in FIGS. 5A-B as comprising data buffer 70, operational amplifier 72, a pair of switches 74 and voltage divider circuit 76. As shown in FIGS. 5A-B, data buffer 70 may be coupled for receiving BMC encoded data (BMC data) from a BMC encoder. The output of data buffer 70 may be coupled to operational amplifier 72 through the pair of switches 74 and voltage divider circuit 76.

When configured to transmit BMC encoded data, switches 74 may be selectively actuated for supplying a transmit (Tx) node voltage to the '0' input of multiplexer 64. Operational amplifier 72 may compare and set the Tx_ref node voltage equal to a reference voltage (Vbg) supplied, e.g., by a bandgap reference voltage generator (not shown). Voltage divider circuit 76 may divide the Tx_ref node voltage by a ratio of R1/(R1+R1) to generate the transmit (Tx) node voltage, which may be supplied to the '0' input of multiplexer 64. When BMC data is '0', the lower switch 74 may be closed and the upper switch 74 may be opened to supply a relatively low voltage (e.g., 0V) to the '0' input of multiplexer 64. When BMC data is '1', the lower switch 74 may be opened and the upper switch 74 may be closed for supplying a relatively higher voltage (e.g., Vbg/2 V) to the '0' input of multiplexer 64.

In the exemplary embodiments shown in FIGS. 5A-B, operational amplifier 72 is coupled between an input supply voltage (Vext) and ground. According to one embodiment, the input supply voltage (Vext) may range between about 2.1 V and about 3.6 V. In one example, operational amplifier 72 may provide a relatively low closed loop gain (e.g., about 1), but may provide a relatively high open loop gain (e.g., about 100 dB). The resistance of the R1 resistors included within voltage divider circuit 76 may be equal, and may be small enough to ensure adequate settling time at the positive input of the amplifier 66. In one example, the resistance of the R1 resistors may range between about 30 kΩ and about 50 kΩ, and may be about 40 kΩ in one embodiment.

In some embodiments, switches SW1-SW5 may reside within the pad of the transmitting port. In other embodiments, switches SW1-SW5 may reside within the transmitting port, but outside of the pad. In the embodiments of FIGS. 5A-B, switches SW1, SW2, SW3 and SW5 are illustrated as residing within the pad (34 or 38) of the transmitting port, along with Ip/Rp and Rd. Although not explicitly illustrated in FIGS. 4-5, it is noted that each port may include two SW1 switches, two SW2 switches, two SW3 switches and two SW5 switches, i.e., one set of switches SW1, SW2, SW3 and SW5 for each CC pin. By locating these switches within the pad, the transmitter circuit may be connected through the switches to either the CC1 pin or the CC2 pin. Because the fourth switch SW4 resides within the transmitter circuit, only one SW4 switch may be needed.

As shown in FIGS. 5A-B, each port may further include a plurality of switches 78 and electrostatic discharge resistors (Resd) 80 for each CC pin. For example, a first switch 78 and a first ESD resistor 80 may be coupled in series between each CC pin and switch SW2, while a second switch 78 and a second ESD resistor 80 may be coupled in series between each CC pin and switch SW5. Switches 78 and ESD resistors 80 may also be included within the pad, and may be used for providing 5V and ESD protection and improving the reliability of the design.

In some embodiments, stability may be improved by providing amplifier 66 with a closed loop gain greater than 1. In one example, the closed loop gain of amplifier 66 may be 2. To ensure an overall gain of 1, a first voltage divider circuit 82 may be coupled between switch SW1 and the '1' input of multiplexer 64, and a second voltage divider circuit 84 may be coupled between SW2, SW4 and the negative input of amplifier 66 in FIGS. 5A-B. Voltage divider circuits 82 and 84 divide the CC pin voltage and the sensed node voltage by 2, so that when multiplied by the amplifier gain, a TxVo node voltage substantially equal to the CC pin voltage will be generated at the output of the amplifier.

Generally speaking, the resistance of the R2 resistors included within the first voltage divider circuit 82 may be equal, and the resistance of the R3 resistors included within second voltage divider circuit 84 may also be equal. In one example embodiment, the resistance of the R2 resistors may be about 90 kΩ and the resistance of the R3 resistors may be about 130 kΩ Although the value of resistors R2 and R3 may be equal to each other in some embodiments, other embodiments may use different resistance values for R2 and R3.

Figure 6:
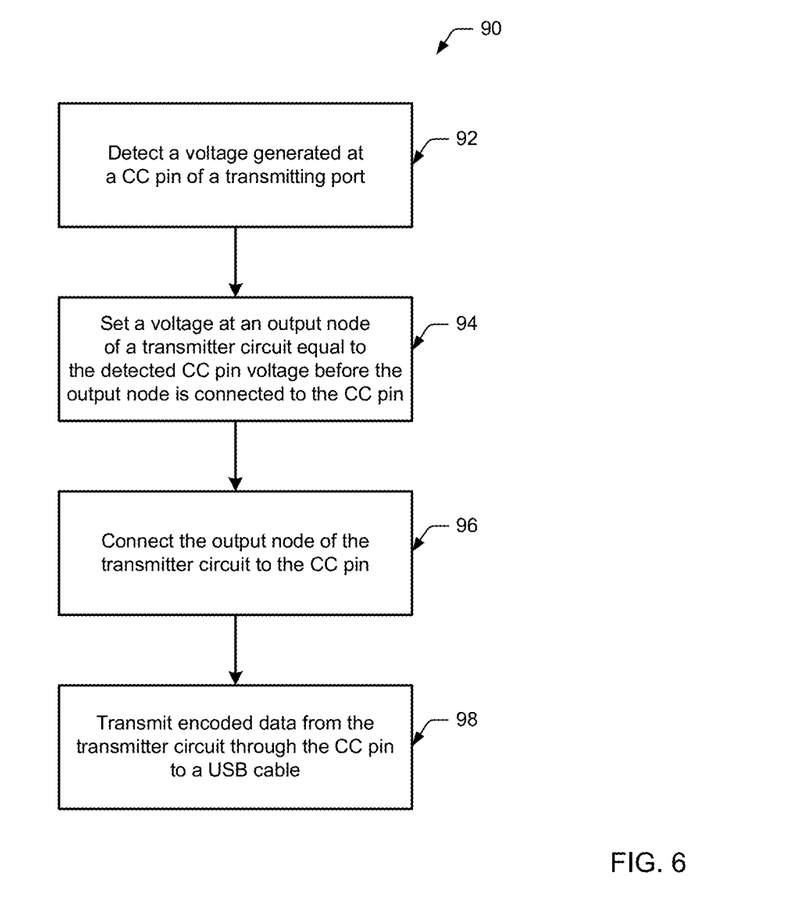
FIG. 6 is a flowchart diagram illustrating one embodiment of a method to transmit encoded data across the CC line of a USB cable.

FIG. 6 illustrates an exemplary embodiment of a method 90 to transmit BMC encoded data signals across a USB cable from a transmitter circuit included within a transmitting port of a USB Type-C connector to a receiver circuit included within a receiving port another USB Type-C connector. The method illustrated in FIG. 6 enables the transmitter circuit of the transmitting port to control the slew rate of each transition, or edge, of a BMC encoded data signal, including the initial transition from the high impedance state to the logic '0' state when transmitting the first bit of the BMC encoded data signal, while meeting the rise and fall times set forth in the PD specification. In doing so, the illustrated method avoids the undesirable problems mentioned above, such as voltage ringing on the CC line, reduced power efficiency during start transmission, and false triggering of the receiver.

Before method 90 begins, switch SW3 may be closed to designate the transmitting port as either a DFP or an UFP, switch SW4 may be closed to tie the output node and negative input of amplifier 66 together, and switches SW1, SW2, and SW5 may be opened to disconnect the output node of the amplifier (and thus, the output node of the transmitter circuit) from the connected CC pin. As noted above with respect to FIGS. 4-5, closing switch SW3 may enable current to flow from a current source (Ip) in one port to a pull-down resistor (Rd) and ground connection in another port, and this current flow may enable a voltage ($V_{CCpin}$) to be generated at the connected CC pins.

According to one embodiment, method 90 may begin by sensing the voltage ($V_{CCpin}$) generated at the connected CC pin of the transmitting port in step 92, and setting the voltage (TxVo) at the output node of amplifier 66 equal to the sensed CC pin voltage in step 94. This may be achieved, in one embodiment, by supplying a sel='1' signal to multiplexer 64 and a close signal to switch SW1. Closing switch SW1 provides the CC pin voltage (or a voltage proportional to the CC pin voltage in the embodiments of FIGS. 5A-B) to the positive terminal of amplifier 66. Because the output and the negative input of amplifier 66 are coupled together through switch SW4, amplifier 66 drives the voltage (TxVo) at the output node of the amplifier to the CC pin voltage ($V_{CCpin}$), thereby driving the output node of the transmitter circuit to the sensed CC pin voltage. During steps 92 and 94, all other switches remain in their previous state (e.g., SW3 and SW4 remain closed and SW2 and SW5 remain open), and the output node of the transmitter circuit remains disconnected from the CC pin. After a time delay (e.g., about 3 μs) sufficient for amplifier 66 to sense and equalize the CC pin voltage, a sel='0' signal is supplied to multiplexer 64, an open signal is supplied to switch SW1, and a close signal is supplied to switches SW2 and SW5 to connect the output node of the transmitter circuit to the CC pin in step 96, and transmit the BMC encoded data onto the CC line of the USB cable 36 in step 98. Switch SW4 may be opened a short time delay (e.g., about 5 ns) after switches SW2 and SW5 are closed.

As noted above, the CC line of the USB cable 36 is released to the high impedance state a short time after the final bit of every PD communication message is transmitted, and remains in the high impedance state until the first bit of a subsequent PD communication message is transmitted. In the high impedance state, the CC line voltage is unknown and can vary widely (e.g., between about 0.25V and about 2.45 V). By equalizing the output node voltage (TxVo) to the sensed CC pin voltage (in step 94), the method show in FIG. 6 enables the transmitter circuit to drive the TxVo output node voltage to a known voltage (e.g., $V_{CCpin}$=IpRd) before the output node of the transmitter circuit is connected to the CC pin (in step 96). This enables the transmitter circuit to more precisely control the initial transition from the CC pin voltage sensed during the high impedance state to the logic '0' state when transmitting the first bit of the PD communication message, and as a result, enables the transmitter circuit to meet the fall time specification (e.g., 300 ns) for the first bit transmission.

In some embodiments, additional circuit elements may be included within the circuitry 60 shown in FIGS. 4-5 to enable the voltage at the CC pin to be accurately sensed and to control the slew rate for each transition, or edge, of the BMC encoded data signal, which is transmitted after the first bit transmission. These additional circuit elements are shown in the circuit diagram of FIG. 7 as transistor 86 and capacitor 88.

Figure 7:
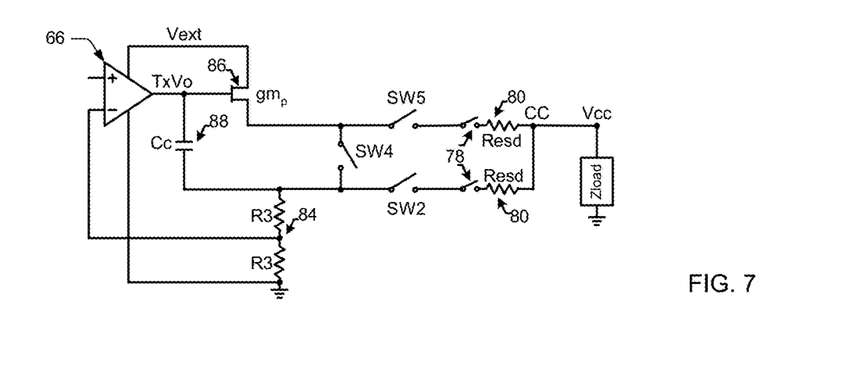
FIG. 7 is a circuit diagram illustrating additional circuit elements that may be included within the additional circuitry shown in FIGS. 4-5 to ensure that the CC pin voltage is accurately sensed.

As shown in the embodiment of FIG. 7, the TxVo output of amplifier 66 may be coupled to the gate of transistor 86, which is coupled between the supply voltage (Vext) and switch SW5. By coupling transistor 86 in such a manner, the error voltage drop across switch SW5, switch 78 and Resd resistor 80 can be canceled by sensing the CC pin voltage (Vcc) through the current path established through Resd resistor 80, switch 78, switch SW2, and voltage divider 84 to the negative input of amplifier 66. In the embodiment shown in FIG. 7, the CC pin voltage (Vcc) generated across the load (Zload) is accurately sensed by providing the main loop with a high open loop gain, so that the main loop will ensure that the positive input of amplifier 66 is equal to the negative input of amplifier 66. In FIG. 7, the main loop extends from the TxVo output node to the drain of transistor 86, to switch SW5, switch 78, and Resd resistor 80, to CC, to Resd resistor 80, switch 78, and switch SW2, to R3 and back to the negative input of amplifier 66.

In order to control the slew rate for each transition of the BMC encoded data signal, a two pole amplifier design is provided to improve the frequency response and stability of amplifier 66. This is achieved, in the embodiment of FIG. 7, by coupling capacitor 88 between the TxVo output of amplifier 66 and the node at switch SW2, which is coupled through voltage divider 84 to the negative input node of the amplifier 66. By inserting capacitor 88 between the input and output of amplifier 66, the non-dominant pole at the CC pin (Vcc) is moved to a higher frequency, while the dominant pole at the TxVo output of amplifier 66 is moved to a lower frequency. This pole movement increases the stability of amplifier 66 and maintains a consistent slew rate and bandwidth, thereby enabling the transmitter to achieve consistent rise and fall times. Amplifier stability is maintained in the embodiment of FIG. 7 even when switching between the CC1 and CC2 pins.

As described above, the method 90 shown in FIG. 6 may be implemented by supplying a sequence of control signals to the multiplexer 64 and the switches (SW1 . . . SW5) included within the additional circuitry 60 shown, e.g., in FIGS. 4A-B and 5A-B. As further noted above, the sequence of control signals may be provided by a controller, such as controller 68 shown in FIGS. 4A-B and 5A-B and described above. According to one embodiment, the method steps shown in FIG. 6 and/or the sequence of control signals described above may be implemented by, or performed under the control of a digital logic block included within controller 68. According to another embodiment, the method steps shown in FIG. 6 and/or the sequence of control signals described above may be implemented by, or performed under the control of program instructions, which may be stored within and/or executed by an on-chip controller or processing device, such as the microcontroller units (MCUs) 56 and 58 shown in FIG. 3. In one example, the digital logic block or the program instructions executed by an on-chip controller or processing device may implement a state machine for controlling the state of the multiplexer and switches shown in FIGS. 4 and 5.

Figure 8:
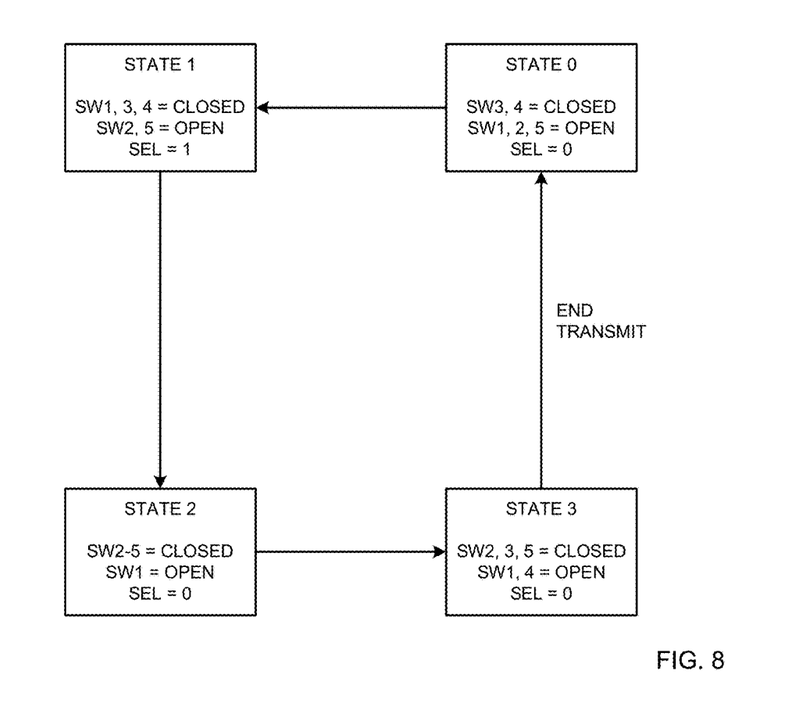
FIG. 8 is an exemplary state diagram for a controller.

FIG. 8 illustrates an exemplary state diagram for a state machine implementation. Prior to the initial state (state 0), a close signal may be supplied to switch SW3 to establish current flow at the CC pin and generate a CC pin voltage ($V_{CCpin}$) across the pull-down resistor (Rd) in either the upstream or downstream facing port. As noted above, switch SW3 may be closed when the port was designated as an upstream facing port or a downstream facing port, and may remain closed until the port role is changed.

In the initial state (state 0) shown in FIG. 8, a sel='0' signal may be supplied to the select input of multiplexer 64, a close signal may be supplied to switch SW4 to tie the output node of amplifier 66 to the negative input of amplifier 66, and open signals may be supplied to switches SW1, SW2 and SW5 to disconnect the output of the amplifier 66 (and thus, the output of the transmitter circuit) from the connected CC pin. In state 1, a sel='1' signal may be supplied to the select input of multiplexer 64 and a close signal may be supplied to switch SW1 to sense the CC pin voltage ($V_{CCpin}$) and set the voltage (TxVo) at the output node of amplifier 66 equal to the sensed CC pin voltage. Switches SW3 and SW4 remain closed and switches SW2 and SW5 remain open in state 1. After a short time delay (e.g., about 3 μs), a sel='0' signal may be supplied to the select input of multiplexer 64, an open signal may be supplied to switch SW1, and close signals may be supplied to switches SW2 and SW5 (in state 2) to connect the output node of the transmitter circuit to the CC pin and transmit the encoded data bits onto the CC line of the USB cable 36. A short time delay (e.g., about 5 ns) after switches SW2 and SW5 are closed, an open signal may be supplied to switch SW4 in state 3, and the state of the multiplexer and switches may remain in state 3 until the final bit of the encoded data is transmitted. After the final bit transmission, the CC line may be held for a minimum duration of tHoldLowBMC (e.g., at least 1 μs) before the CC line may be released to the high impedance state and the state of the multiplexer and switches may return to state 0.

It will be appreciated to those skilled in the art having the benefit of this disclosure that this disclosure is believed to provide a system, USB Type-C connector and method to transmit Bi-phase Mark Coding (BMC) encoded data signals across a configuration channel (CC) line of a USB cable connecting a transceiver within a transmitting port to a transceiver within a receiving port of the system. In the present disclosure, additional circuitry is provided within an upstream and downstream port to control the slew rate of each transition, or edge, of a BMC encoded data signal transmitted from the transceiver circuit, while meeting the rise and fall times set forth in the PD specification. The additional circuitry and methods described herein enable the transceiver circuit to control the slew rate and meet the specified rise and fall times during all transitions of the BMC encoded data signal, including the initial transition from the high impedance state to the logic '0' state and each subsequent rising and falling edge transition. In doing so, the additional circuitry and methods described herein avoid many undesirable problems, such as voltage ringing on the CC line, reduced power efficiency during start transmission, and false triggering of a receiver within an upstream USB Type-C connector.

Figure 9:
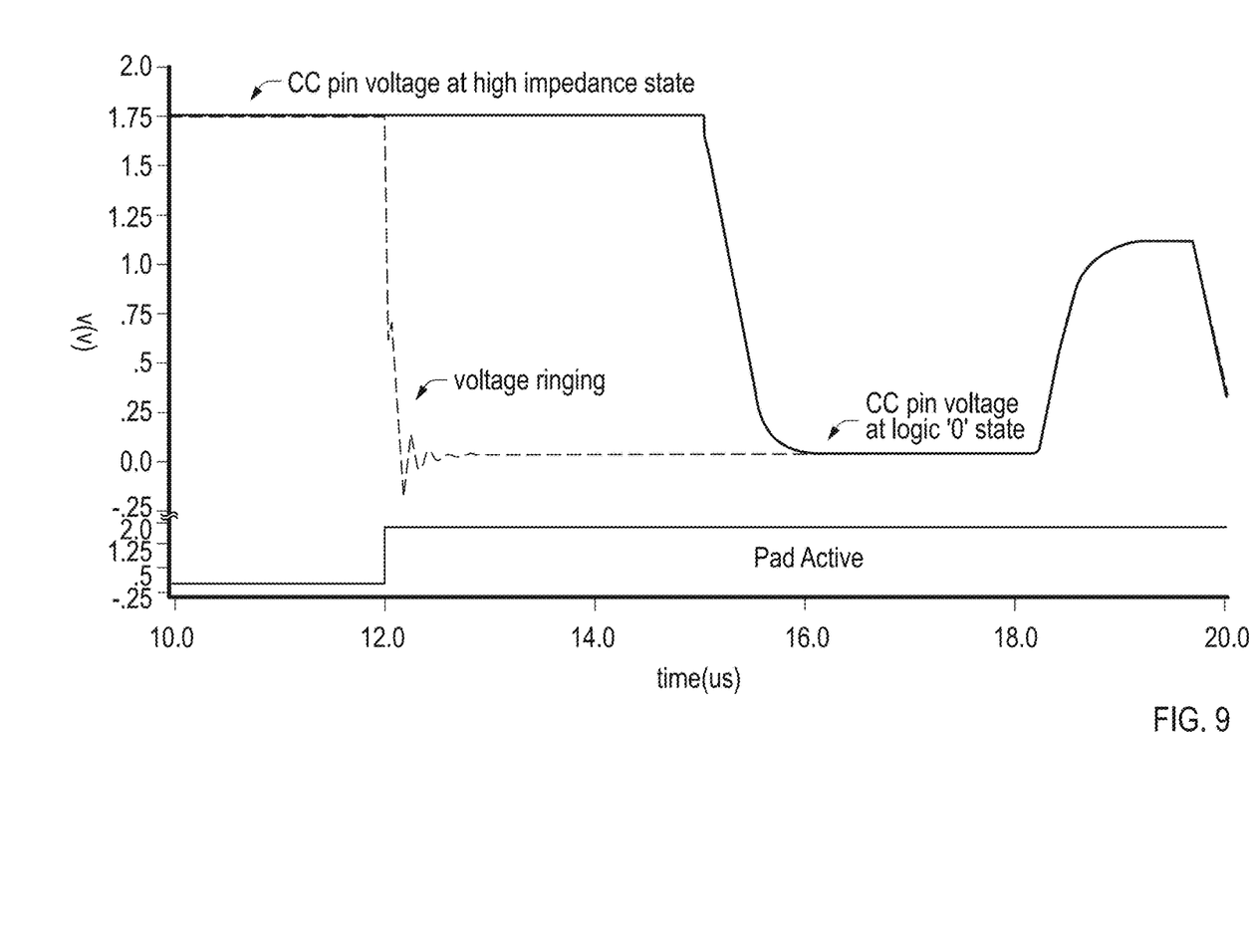
FIG. 9 is a graph illustrating the slew rate control provided by the additional circuitry and method disclosed herein.

FIG. 9 is a graph illustrating the voltage ringing that typically occurs on the CC line (dashed line) when the pad initially becomes active ("pad active"), such as when transitioning from the high impedance state to the logic '0' state during the first bit transmission, and the slew rate control (solid line) provided by the additional circuitry 60 and method 90 disclosed herein.

As shown in FIG. 9, the voltage at the CC pin can "ring" (dashed line) when the pad is initially activated due to the unknown voltage on the CC line (e.g., about 0.25 V to about 2.45 V) during the high impedance state and the large cable inductance (e.g., about 640 nH) of an attached USB cable. This voltage ringing is undesirable, as it may prevent the transmitter circuit from meeting the fall time requirement set forth in the PD specification, and may falsely trigger an upstream receiver circuit to turn on. FIG. 9 further illustrates that when the additional circuitry 60 and method 90 disclosed herein are employed (solid line), voltage ringing is avoided and a well-controlled slew rate is achieved when transitioning from the high impedance state to the logic '0' state during the first bit transmission.

Further modifications and alternative embodiments of various aspects of the disclosure will be apparent to those skilled in the art in view of this description. It is to be understood that the various embodiments of the system, USB Type-C connectors, and methods shown and described herein are to be taken as the presently preferred embodiments. Elements and materials may be substituted for those illustrated and described herein, parts and processes may be reversed, and certain features of the disclosed embodiments may be utilized independently, all as would be apparent to one skilled in the art after having the benefit of this disclosure. It is intended, therefore, that the following claims be interpreted to embrace all such modifications and changes and, accordingly, the specification and drawings are to be regarded in an illustrative rather than a restrictive sense.

What is claimed is:

1. A USB Type-C connector, comprising:
a plurality of switches, each coupled to a configuration channel (CC) pin of the USB Type-C connector;
a transmitter circuit having an output node switchably coupled to the CC pin through at least a subset of the plurality of switches; and
a controller configured to supply a sequence of control signals to the transmitter circuit and the plurality of switches to set a voltage at the output node of the transmitter circuit equal to a voltage generated at the CC pin before the output node of the transmitter circuit is connected to the CC pin to transmit encoded data to the CC pin.

2. The USB Type-C connector as recited in claim 1, wherein the transmitter circuit comprises a multiplexer comprising a first input coupled to receive the encoded data, a second input coupled via a first switch of the plurality of switches to the CC pin, a select input, and an output.

3. The USB Type-C connector as recited in claim 2, wherein the transmitter circuit further comprises an amplifier comprising:
a first input coupled to receive the output from the multiplexer;
a second input coupled via a second switch of the plurality of switches to the CC pin; and
an output, which is the output node of the transmitter circuit;
wherein the amplifier output is coupled via a fourth switch of the plurality of switches to the second input of the amplifier and further coupled via a fifth switch of the plurality of switches to the CC pin.

4. The USB Type-C connector as recited in claim 3, further comprising a pull-down resistor coupled between the CC pin and a third switch of the plurality of switches, which is coupled to ground.

5. The USB Type-C connector as recited in claim 3, wherein a third switch of the plurality of switches is coupled between a current source and the CC pin.

6. The USB Type-C connector as recited in claim 4 or 5, wherein the controller is configured to supply the sequence of control signals to the select input of the multiplexer and to the first, second, third, fourth and fifth switches to equalize the voltage at the amplifier output to the voltage at the CC pin before the amplifier output is connected to the CC pin to transmit the encoded data to the CC pin.

7. The USB Type-C connector as recited in claim 6, wherein the controller is configured to supply a close signal to the third switch to establish current flow through the pull-down resistor and generate the voltage at the CC pin.

8. The USB Type-C connector as recited in claim 6, wherein the controller is configured to supply:
    open signals to the first, second and fifth switches to disconnect the amplifier output from the CC pin; and
    a close signal to the fourth switch to couple the amplifier output to the second input of the amplifier.

9. The USB Type-C connector as recited in claim 6, wherein the controller is configured to supply:
    a select signal to the multiplexer to select the second input of the multiplexer; and
    a close signal to the first switch to sense the voltage generated at the CC pin and set the voltage at the amplifier output equal to the voltage at the CC pin.

10. The USB Type-C connector as recited in claim 6, wherein the controller is configured to supply:
    a select signal to the multiplexer to select the first input of the multiplexer; and
    an open signal to the first switch, and close signals to the second and fifth switches to connect the amplifier output to the CC pin and transmit the encoded data to the CC pin.

11. The USB Type-C connector as recited in claim 10, wherein after the fifth switch is closed, the controller is configured to supply an open signal to the fourth switch.

12. A method to transmit encoded data across a USB cable from a transmitter circuit included within a transmitting port of a USB Type-C connector, the method comprising:
    detecting a voltage generated at a configuration channel (CC) pin of the transmitting port;
    setting a voltage at an output node of the transmitter circuit equal to the voltage detected at the CC pin before the output node is connected to the CC pin;
    subsequently connecting the output node of the transmitter circuit to the CC pin through at least one switch; and
    transmitting the encoded data from the transmitter circuit through the CC pin to the USB cable.

13. The method as recited in claim 12, wherein:
    the USB Type-C connector comprises a first switch, a second switch, a third switch, a fourth switch and a fifth switch, wherein the third switch is coupled to: (a) a pull-down resistor, (b) a current source, or (c) a voltage source and a pull-up resistor; and
    the transmitter circuit comprises:
        a multiplexer comprising a first input coupled to receive the encoded data, a second input coupled via the first switch to the CC pin, a select input, and an output; and
        an amplifier comprising a first input coupled to receiving the output from the multiplexer, a second input coupled via the second switch to the CC pin, and an output, which is the output node of the transmitter circuit, wherein the amplifier output is coupled via the fourth switch to the second input of the amplifier and further coupled via the fifth switch to the CC pin.

14. The method as recited in claim 13, wherein prior to the step of detecting a voltage, the method comprises:
    supplying a close signal to the third switch to generate the voltage at the CC pin;
    supplying a close signal to the fourth switch to couple the amplifier output to the second input of the amplifier; and
    supplying open signals to the first, second and fifth switches to disconnect the amplifier output from the CC pin.

15. The method as recited in claim 13, wherein the step of detecting a voltage generated at the CC pin and the step of setting a voltage at an output node of the transmitter circuit comprise:
    supplying a select signal to the multiplexer to select the second input of the multiplexer circuit; and
    supplying a close signal to the first switch to detect the voltage generated at the CC pin and set the voltage at the amplifier output equal to the voltage detected at the CC pin.

16. The method as recited in claim 13, wherein the step of subsequently connecting the output node of the transmitter circuit and the step of transmitting the encoded data comprise:
    supplying a select signal to the multiplexer to select the first input of the multiplexer;
    supplying an open signal to the first switch, and close signals to the second and fifth switches to connect the amplifier output to the CC pin and transmit the encoded data from the transmitter circuit through the CC pin to the USB cable.

17. The method as recited in claim 16, wherein after the fifth switch is closed, the method further comprises supplying an open signal to the fourth switch.

18. A system comprising a first USB Type-C connector coupled to a second USB Type-C connector via a USB cable, wherein the first USB Type-C connector comprises:
    at least one configuration channel (CC) pin;
    a plurality of switches, each coupled to the at least one CC pin;
    a transmitter circuit having an output node, which is switchably coupled to the at least one CC pin through at least a subset of the plurality of switches to transmit encoded data across the USB cable to a CC pin of the second USB Type-C connector; and
    a controller configured to supply a sequence of control signals to the transmitter circuit and the plurality of switches to set a voltage at the output node of the transmitter circuit equal to a voltage generated at the at least one CC pin before the output node of the transmitter circuit is connected to the at least one CC pin to transmit the encoded data across the USB cable.

19. The system as recited in claim 18, wherein the transmitter circuit comprises a multiplexer comprising a first input coupled to receive the encoded data, a second input coupled via a first switch of the plurality of switches to the CC pin, a select input, and an output.

20. The system as recited in claim 19, wherein the transmitter circuit further comprises an amplifier comprising:
    a first input coupled to receive the output from the multiplexer;
    a second input coupled via a second switch of the plurality of switches to the CC pin; and
    an output, which is the output node of the transmitter circuit;
    wherein the amplifier output is coupled via a fourth switch of the plurality of switches to the second input of the amplifier and further coupled via a fifth switch of the plurality of switches to the CC pin.

21. The system as recited in claim 20, wherein:
the first USB Type-C connector further comprises a pull-down resistor coupled between the at least one CC pin and a third switch of the plurality of switches, which is coupled to ground;
the second USB Type-C connector comprises: (a) a pull-up resistor coupled between the CC pin and a voltage source, or (b) a current source coupled to the CC pin; and
the controller is configured to:
supply open signals to the first, second and fifth switches to disconnect the amplifier output from the at least one CC pin; and
supply a close signal to the third switch to establish current flow from the pull-up resistor or the current source in the second USB Type-C connector through the pull-down resistor in the first USB Type-C connector to generate the voltage at the at least one CC pin.

22. The system as recited in claim 21, wherein the controller is further configured to supply:
a close signal to the fourth switch to couple the amplifier output to the second input of the amplifier;
a select signal to the multiplexer for selecting the second input of the multiplexer; and
a close signal to the first switch to detect the voltage generated at the at least one CC pin and set a voltage at the amplifier output equal to the voltage detected at the at least one CC pin.

23. The system as recited in claim 22, wherein the controller is further configured to supply:
a select signal to the multiplexer for selecting the first input of the multiplexer;
an open signal to the first switch, and close signals to the second and fifth switches to connect the amplifier output to the at least one CC pin and transmit the encoded data across the USB cable; and
an open signal to the fourth switch after the fifth switch is closed.

24. The system as recited in claim 20, wherein:
the first USB Type-C connector further comprises a third switch of the plurality of switches, which is coupled between a current source and the at least one CC pin or a voltage source and pull-up resistor and the at least one CC pin;
the second USB Type-C connector comprises a pull-down resistor coupled to ground; and
the controller is configured to:
supply open signals to the first, second and fifth switches to disconnect the amplifier output from the at least one CC pin; and
supply a close signal to the third switch to establish current flow from the pull-up resistor or the current source in the first USB Type-C connector through the pull-down resistor in the second USB Type-C connector to generate the voltage at the at least one CC pin.

25. The system as recited in claim 24, wherein the controller is further configured to supply:
a close signal to the fourth switch to couple the amplifier output to the second input of the amplifier;
a select signal to the multiplexer for selecting the second input of the multiplexer; and
a close signal to the first switch to detect the voltage generated at the at least one CC pin and set a voltage at the amplifier output equal to the voltage detected at the at least one CC pin.

26. The system as recited in claim 25, wherein the controller is further configured to supply:
a select signal to the multiplexer for selecting the first input of the multiplexer;
an open signal to the first switch, and close signals to the second and fifth switches to connect the amplifier output to the at least one CC pin and transmit the encoded data across the USB cable; and
an open signal to the fourth switch after the fifth switch is closed.

* * * * *